United States Patent [19]

Walsh

[11] 3,853,399

[45] Dec. 10, 1974

[54] METHOD OF STORING AND RETRIEVING INFORMATION

[75] Inventor: Robert J. Walsh, Cardova, Tenn.

[73] Assignee: Plough, Inc., Bloomfield, N.J.

[22] Filed: Oct. 17, 1973

[21] Appl. No.: 407,315

[52] U.S. Cl. .................................................. 355/64
[51] Int. Cl. ............................................ G03b 27/64
[58] Field of Search ......... 355/54, 64, 65; 340/172.5

[56] References Cited

UNITED STATES PATENTS

| | | | |
|---|---|---|---|
| 1,806,763 | 5/1931 | McCarthy | 355/64 |
| 1,919,957 | 7/1933 | Lyman | 355/64 |
| 3,299,776 | 1/1967 | Baptie | 355/54 |

*Primary Examiner*—John M. Horan
*Attorney, Agent, or Firm*—Fidelman, Wolffe, Leitner & Hiney

[57] ABSTRACT

A method of storing and retrieving information which has been gathered from a plurality of documents comprises the steps of (1) randomly filming a document on a roll of film while simultaneously imprinting a film index number on the document, (2) encoding the film index number, a library access number and a document number onto a storage means to form input data, (3) sorting the input data by means of electronic data processing equipment to place the input data in order by library access number and generate a magnetic tape containing the input data in order by library access number, (4) converting the ordered magnetic tape into a strip of film containing the input data in order by library access number and (5) cutting the ordered strip of film into a plurality of microfiche forms so that a library of microfiche forms arranged by library access number has been created.

5 Claims, 3 Drawing Figures

METHOD OF STORING AND RETRIEVING INFORMATION

BACKGROUND OF THE INVENTION

1. Field of the Invention

The present invention relates generally to a method of information storage and retrieval and more particulary to a method of forming an ordered library of microfiche forms containing sufficient information to enable the retrieval of copies of original documents.

2. Description of the Prior Art

In prior art systems, many large volume indices (libraries of indexed data) have been stored in a computer. For example, U.S. Pat. Nos. 3,585,597 and 3,700,320 show information storage and retrieval systems utilizing coded microfilm strips to store the information and computer memory circuitry triggered by a keyboard input to automatically retrieve the coded strips and display the desired information. U.S. Pat. Nos. 3,332,071 and 3,689,894 show examples of information storage and retrieval systems wherein the information is recorded on microfilm and assembled on encoded microfiche cards. The encoded cards are then retrieved from a storage bin and displayed in response to a keyboard input to computer memory circuitry. It is important to note that all of these prior art systems require the use of a computer in the retrieval process. This requirement creates a problem because computers are expensive to operate and program and result in further expense in order to maintain large volume indices in a current secure status. Furthermore, the known systems, to be at all responsive to the needs of the user, require extensive sorting, sequencing and separation of documents and also require splicing and labelling of microfilm cartridges. All of these operations are quite time consuming and costly. Additionally, the computerized retrieval operation of the various known systems require the employment of well trained operators to punch in the proper input to initiate the retrieval operation.

OBJECTS OF THE INVENTION

Accordingly, an important object of the present invention is the provision of an information search and retrieval system that does not require the use of a computer in the retrieval operation.

Another object of the present invention is the provision of a search and retrieval system which for all practical purposes can accommodate an unlimited volume of index data in a relatively small storage area.

A further object of the present invention is the provision of a search and retrieval system which requires no manual sorting.

A still further object of the present invention is the provision of a search and retrieval system in which the retrieval operation is simple and inexpensive, thus obviating the need for utilizing highly skilled employees.

Another object of the present invention is the provision of a search and retrieval system wherein electronic data processing equipment is needed only for a brief period of time and can be utilized in non-peak hours, primarily for file maintenance.

A further object of the present invention is the provision of a search and retrieval system which will maintain maximum file integrity.

SUMMARY OF THE INVENTION

The present invention provides a method of storing and retrieving information which has been gathered from a plurality of documents and comprises the steps of (1) randomly filming a document on a roll of film while simultaneously imprinting a film index number on the document, (2) encoding the film index number, a library access number and a document number onto a storage means to form input data, (3) sorting the input data by means of electronic data processing equipment to place the input data in order by library access number and generate a magnetic tape containing the data in order by library access number, (4) converting the ordered magnetic tape into a strip of film containing the input data in order by library access number, and (5) cutting the ordered strip of film into a plurality of microfiche forms so that a library of microfiche forms arranged by library access number has been created. The library is utilized to manually retrieve filmed copies of randomly filmed documents.

Other objects, advantages and novel features of the present invention will become apparent from the following detailed description of the invention when considered in conjunction with the accompanying drawings.

DESCRIPTION OF THE PREFERRED EMBODIMENT

Figure 1:
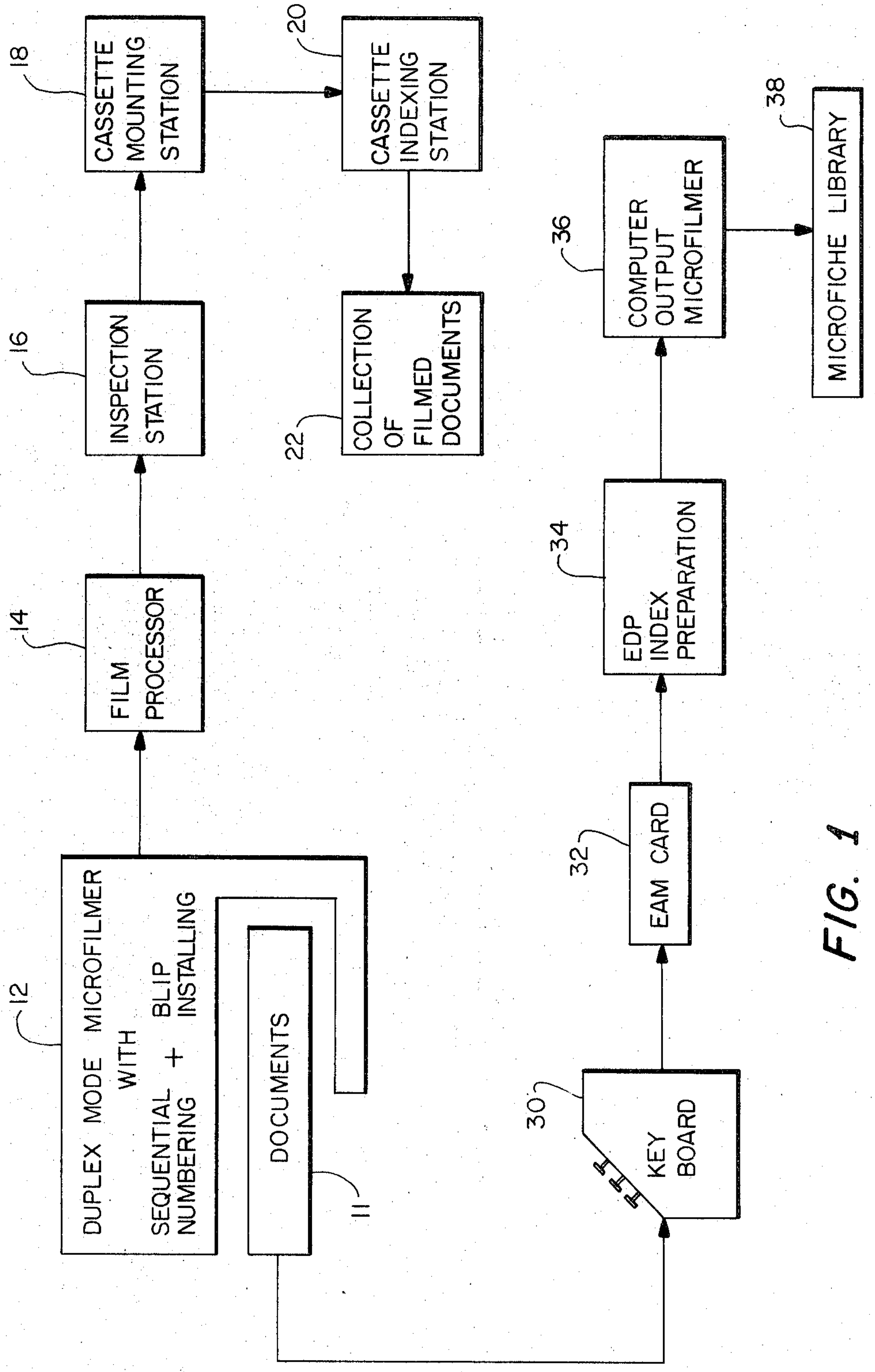
FIG. 1 is a block diagram illustrating the sequential arrangement of the components included in the process of the present invention.
Figure 2:
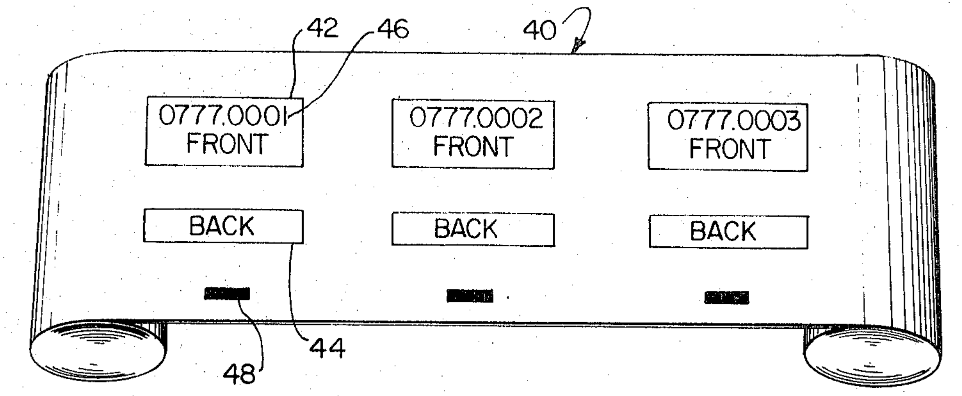
FIG. 2 is a symbolic drawing of a portion of a roll of microfilm utilized in the process of the present invention.
Figure 3:
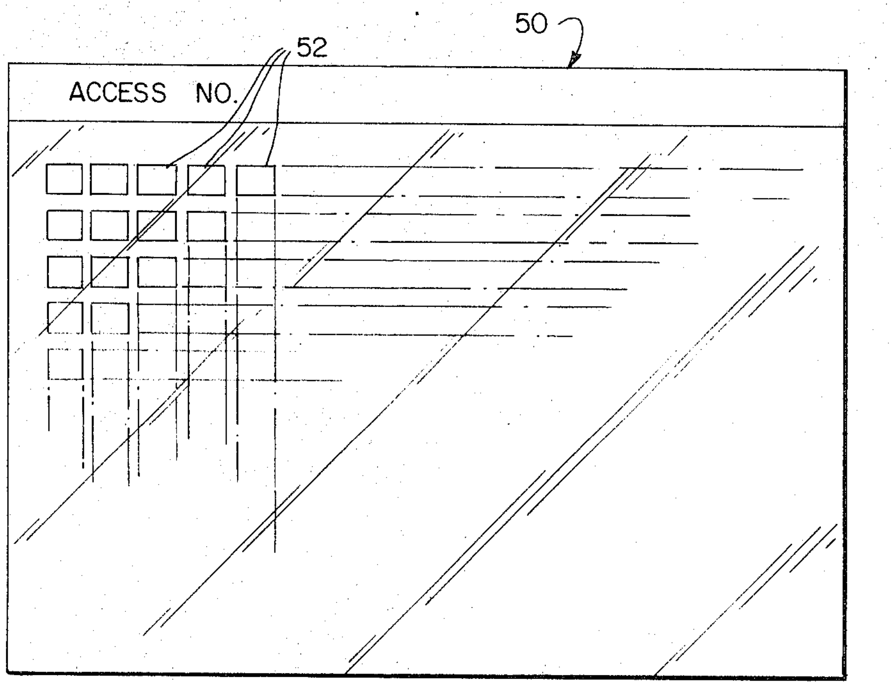
FIG. 3 is a symbolic drawing of a microfiche index card utilized in the process of the present invention.

With reference to FIGS. 1, 2 and 3, the search and retrieval process of the present invention will be described in detail.

Documents 11 in random order are brought to the microfilming area and photographed by a duplex mode microfilmer 12 which photographs the front 42 and back 44 of each image on a roll of 16mm microfilm 40, preferably 100 feet in length, as illustrated in FIG. 2. The microfilmer 12 includes a sequential numbering device which is set in such a manner that a repetitive number and gain numbers are combined to form film index numbers 46 which are imprinted in ink on each randomly filmed document 11. For example, the repetitive number could be 0777, which would be the microfilm reel number. The gain number could be 0001, which would indicate the frame number on which the document has been filmed on reel number 0777. The two numbers would then be combined as 0777.0001 to form a film index number 46. The microfilmer 12 also includes a blip installing device, which is activated to install a standard indexing blip 48 in a standard position under each image on the 16mm microfilm 40. Any microfilmer which is capable of performing the duplex mode filming, numbering and blip installing function described can be used. A suitable commercial microfilmer is the Rotary Model 700, manufactured by Eastman Kodak.

Each 100-foot roll of exposed 16mm microfilm is developed on a known commercial film processor 14. The processed film is then inspected at a known commercial inspection station 16 to ascertain if the film is of acceptable density and resolution and if there has been any malfunction in the microfilmer not monitored by audio alarm. Each processed and inspected roll that is deemed acceptable is mounted in a 16mm film cassette at station 18. The reel number which was ink imprinted on documents 11 is then obtained from those documents and inscribed on the film cassette along with the date of the microfilming at station 20. The cassettes are placed in order by reel number and stored at 22. Thus, a collection of filmed documents, in cassettes and in order by reel number, is created at 22 to await possible retrieval at a later date.

In order to form the microfiche library of the present invention, it is necessary to provide an electronic data processor with encoded input data. This encoding is preferably accomplished by keypunching. Thus, after microfilming has been completed, the documents 11 are sent to the keypunch area to be indexed. Keypunch operators, utilizing standard EAM punchcards 32, punch in on keyboard 30 the pertinent index information, for example:

TABLE I

| Index | Example |
|---|---|
| a) Customer Account No. | 1-01-12345-000 |
| b) Invoice No. | 1601204 |
| c) Type of Document | 2 |
| d) Customer Purchase Order No. | 662370 |
| e) Index No. | 0777.0005 |

In the above example, the customer account number (a) would constitute a library access number to be utilized later in the sorting operation. The paper documents 11 are stored until a check determines that both the microfilm and the indices are secure.

The prepared punchcards 32 are loaded into a disc in an electronic data processor 34 containing the microfilm indices. The electronic data processor 34 sorts the input data from the punchcards 32 and reorders the data by library access number to generate a master magnetic tape containing the data in order by library access number.

For example, the customer account numbers (a) (Table I) could be ordered in numerical sequence and the invoice numbers (b) assigned to a customer's transactions could also be ordered in numerical sequence under that customer's account number.

The ordered master magnetic tape is then loaded into commercially available computer output microfilm equipment 36 to convert the ordered magnetic tape into an ordered strip of film. The computer output microfilm equipment 36 will print out directly onto 105mm microfilm which, when cut, is converted into a microform called microfiche.

Each microfiche sheet 50, as illustrated in FIG. 3, is 105mm high by 148mm wide. The space across the top of each sheet of microfiche 50 is reserved for the visual index, which is readable with the unaided eye. This index will be the access number which, in the Example of Table I, is the customer account number (a). Each microfiche sheet 50 contains approximately 200 frames containing indexing data. Each frame 52 on a microfiche sheet 50 will appear as a standard computer printout form. The following Table II is an example of the type of information that could appear in a portion of a single frame 52:

TABLE II

Illustration of Index Data
Printed on 105mm × 148mm Microfiche

| Customer Account No. | Invoice No. | Type Document | Customer Order No. | Film Reel No. | Film Frame No. |
|---|---|---|---|---|---|
| 1-01-12345-000 | 1601204 | 1 | 662370 | 0777 | 0001 |
| 1-01-12345-000 | 1601204 | 3 | 662370 | 0777 | 0002 |
| 1-01-12345-000 | 1601204 | 4 | 662370 | 0777 | 0003 |
| 1-01-12345-000 | 1601204 | 5 | 662370 | 0777 | 0004 |
| 1-01-12345-000 | 1603796 | 1 | 671960 | 0786 | 1629 |
| 1-01-12345-000 | 1603796 | 3 | 671960 | 0787 | 1921 |
| 1-01-12345-000 | 1603796 | 4 | 671960 | 0786 | 2612 |
| 1-01-12345-000 | 5743100 | 2 | | 0791 | 1541 |

The last image in the extreme lower right hand corner of each microfiche sheet 50 will generally contain the X–Y grid coordinates of all library access numbers contained on the sheet 50.

A plurality of microfiche sheets 50 arranged by library access number are formed into a microfiche library 38. Anyone wishing to view a particular stored document 11 need only (1) locate the proper microfiche sheet 50 in the library 38 by viewing the visible library access number, (2) view the microfiche sheet on a commercially available viewer to ascertain the appropriate film reel number and film frame number, (3) obtain the proper indexed cassette, and (4) view the film in the cassette on a commercially available microfilm viewer. Thus, it is evident that no electronic data processing equipment is required in the retrieval process.

The library 38 may be updated periodically by merely microfilming new documents and placing them in the library by repeating the method described above. Thus, new documents may be filmed, processed, mounted in cassettes, indexed and stored at 22 as deemed convenient by the user. The new documents are then sent to the keypunch area to be indexed. Again, standard EAM punchcards 32 are punched in at 30 to contain the pertinent index information. The newly prepared punchcards 32 are then stored until the user deems it necessary to update the microfiche library 38. This may be done weekly, monthly, etc., depending on the needs of the user. When it is time to update the library 38, the newly prepared punchcards 32 are loaded into a disc in an electronic data processer 34, as before. The master magnetic tape, created during the initial process, is then loaded into the electronic data processor 34. The processor 34 then sorts the input data from the newly processed punchcards 32 and reorders the data by library access number to generate a new master magnetic tape containing the data in order by library access number. The new ordered master magnetic tape is then loaded, as before, into the computer output microfilm equipment 36 to form a new updated microfiche library 38. The old library may be kept for security purposes. Since this updating process may be performed at the convenience of the user, it will generally be performed during non-peak hours of use for the electronic data processor 34. Furthermore, since electronic data processing equipment need only be used in the storage portion of the process to sort accumulated data, it may always be conveniently utilized in non-peak hours.

In addition to the advantages described above, the method of storing and retrieving information of the present invention, for all practical purposes, can accommodate an unlimited volume of index data in an extremely small storage area. The filming of input documents is accomplished in the least expensive manner since no document separation or sorting is required.

While there has been described what is at present considered to be the preferred embodiment of the invention, it will be obvious to those skilled in the art that various changes and modifications may be made therein without departing from the invention. It is, therefore, aimed in the appended claims to cover all such changes and modifications as fall within the true spirit and scope of the invention.

What is claimed is:

1. A method of storing and retrieving information which has been gathered from a plurality of documents comprising:

a. randomly filming a document on a roll of film while simultaneously imprinting a film index number on the document;

b. encoding the film index number, a library access number and a document number onto a storage means to form input data;

c. sorting the input data by means of electronic data processing equipment to place the input data in order by library access number and generate a magnetic tape containing the input data in order by library access number;

d. converting the ordered magnetic tape into a strip of film containing the input data in order by library access number; and e. cutting the ordered strip of film into a plurality of microfiche forms so that a library of microfiche forms arranged by library access number has been created.

2. A method of storing and retrieving information, as set forth in claim 1, further comprising:

f. developing said roll of film g. mounting said roll of film in a film cassette; and h. inscribing on said film cassette said film index number.

3. A method of storing and retrieving information as set forth in claim 1 wherein the ordered strip of film is 105mm microfilm.

4. A method of storing and retrieving information as set forth in claim 1 further comprising periodically repeating steps (*a*) through (*e*) in order to maintain said library in a current state.

5. A method of storing and retrieving information as set forth in claim 1 wherein said encoding comprises keypunching the film index number, the library access number, and the document number on a punchcard to form input data.

6. A method of storing and retrieving information, as set forth in claim 1, wherein each of said microfiche forms contains a plurality of images and wherein the last of said images contains the grid coordinates of all library access numbers contained on that microfiche form.

* * * * *